United States Patent [19]
Etcheparre et al.

[11] 4,315,437
[45] Feb. 16, 1982

[54] DEVICE FOR DRIVING AND DISPLACING A BEAM RESTING UPON GUIDE RAILS, AND ONE OR MORE CARRIAGES ATTACHED TO THE BEAM

[75] Inventors: Jean Etcheparre; Bernard Etcheparre, both of Merignac, France

[73] Assignee: Societe Lectra Systemes, S.A., Pont de le Maye, France

[21] Appl. No.: 927,862

[22] Filed: Jul. 25, 1978

[30] Foreign Application Priority Data

Jul. 25, 1977 [FR] France .................. 77 23575

[51] Int. Cl.³ .................................... F16H 27/02
[52] U.S. Cl. ............................ 74/89.22; 33/1 M
[58] Field of Search ............... 74/89.22, 89.2; 33/1 M, 33/23 C; 346/139 B

[56] References Cited
U.S. PATENT DOCUMENTS

| | | | |
|---|---|---|---|
| 2,675,291 | 4/1954 | Webster | 33/1 M |
| 2,785,941 | 3/1957 | Macklem et al. | 33/1 M |
| 2,847,859 | 8/1958 | Lynott | 346/139 B |
| 3,068,575 | 12/1962 | Fenske et al. | 33/1 M |
| 3,529,481 | 9/1970 | Budzyn | 33/1 M |
| 3,881,369 | 5/1975 | Looney | 74/89.22 |

*Primary Examiner*—Francis K. Zugel
*Attorney, Agent, or Firm*—Sandler & Greenblum

[57] ABSTRACT

This invention relates to a device for driving and displacing a beam in a direction parallel to guide rails, and one or more carriages rigid with the beam in a direction transverse to the displacement of the beam.

The device comprises two cables 7 and 8 stretched over pulleys 5 fixed at the ends of the guide rails 3 for the beam 4, and over pulleys 6 of the beam 4. The cables 7 and 8 are wound in reverse directions on the drums 9 of the motors M 1 and M 2 which are disposed symmetrically on one and the other side of the rails, such that when the motors are rotated, they cause the displacement of the beam, or of the carriage fixed on to one of the cables, or the simultaneous displacement of the beam and carriage.

2 Claims, 3 Drawing Figures

DEVICE FOR DRIVING AND DISPLACING A BEAM RESTING UPON GUIDE RAILS, AND ONE OR MORE CARRIAGES ATTACHED TO THE BEAM

This invention relates to a device for driving and displacing a beam in a direction parallel to guide rails, and for driving and displacing one or more carriages rigid with the beam in a direction transverse to the displacement of the beam.

Devices for driving carriages and beams of automatic drawing boards are known, formed by means of at least two motors acting independently for displacing the beam along an axis parallel to the support guides, and for displacing the carriage along an axis perpendicular to the displacement of the beam, the drive and/or displacement of the beam and carriage being obtained by members such as screws, cables and chains, each connected independently to one motor. The members which cause the displacement are generally disposed on one side and another of the beam and carriage, such that their positioning is precise, and in order to prevent them from being moved askew. With this design, the construction cost is very large both because of the machined pieces and because of the power of the motors.

The object of the invention is to obviate the previously stated drawbacks.

The invention provides a device for driving and displacing a beam in a direction parallel to mutually parallel guide rails, and for driving and displacing one or more carriages rigid with the beam and supporting drawing, cutting or any other members guided by the beam, in a direction transverse to the displacement of said beam by means of cables and two motors of any construction, but which can rotate in both directions, comprised by each motor being disposed symmetrically on one side and the other of the parallel guide rails, on the drums which extend from them there being wound in reverse directions on and endless cable or two symmetrical cables, the said cable or cables being stretched over four pulleys fixed to the ends of the guide rails and over four pulleys fixed to the beam in such a manner that the portions of the cable or cables define an H shape.

The cable or cables are wound over each of the drums such that when the drum or drums are rotated independently or simultaneously, the cable portions on one side thereof wind up, whereas those on the other side thereof unwind, so that when the cable or cables are wound up symmetrically by rotating the drums in opposite directions, the beam is displaced towards that side on which the cable portions are being wound on to the drums. If a carriage is rigid with one of the portions of the cable stretched over the four pulleys of the beam, and if the drums rotate in the same direction, the carriage moves along an axis parallel with the beam. If only one drum is rotated, the cable portions unwind and wind symmetrically about the drum, to simultaneously displace the beam and carriage, and to produce a diagonal trajectory, trace or cut, said displacement being directed towards that side on which the drum is winding the cable portion.

According to a further embodiment, it is possible to displace at least two carriages, each of which, by means of electro-mechanical members or the like, can be remotely connected to or released from a single portion of cable stretched over the pulleys of the beam, or each independently connected to or released from one of the two portions of cable, such that when the carriages are fixed to the same portion of cable, and according to the previously described rotation of the drums, parallel displacements, traces or cuts are obtained, whereas if the carriages are each fixed on to one of the two beam cable portions, when the drums are driven in the same direction the carriages either withdraw from or approach each other. Beacause of this, articulated crossed arms can be disposed on each of the carriages, to unfold in a perpendicular plane or obliquely relative to the plane of displacement of the beam and carriages. Thus when that end of said arms further from the carriages is rigid with a crosspiece supporting working members such as a drill, miller or the like, it enables said members to be displaced in said perpendicular or oblique plane, the ends of the arms being hinged about two fixed points on the crosspiece and carriages. Using this principle, the crossed arms could be advantageously replaced for example by a pantograph or by V arms or any other known means.

Without leaving the scope of the invention, the cable or cables could advantageously be replaced by chains, toothed belts or untoothed belts.

The various displacements of the device according to the invention will be more apparent from the description given hereinafter with reference by way of non-limiting example to the accompanying drawings, in which.

Figure 1:
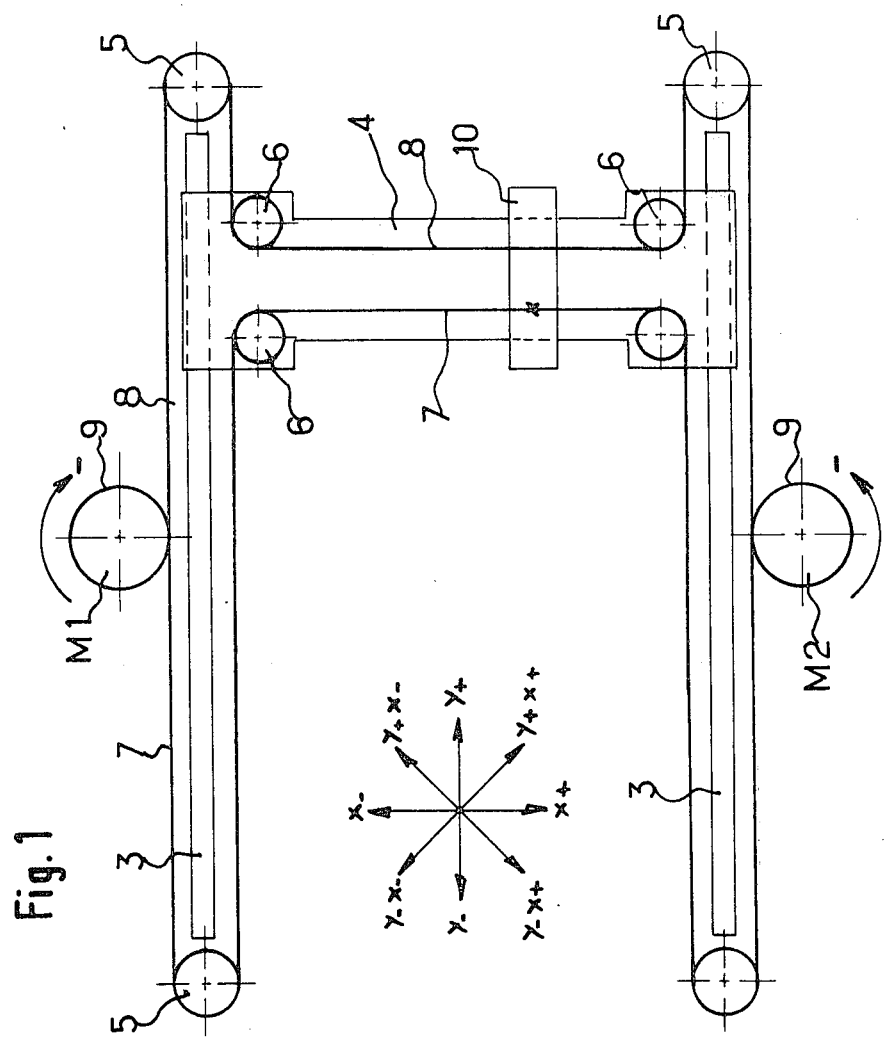
FIG. 1 is a diagram showing the displacements of the beam and one carriage in a horizontal plane.

As shown in FIG. 1, the device comprises two motors M1 and M2 which can rotate in both directions, and are disposed symmetrically on one side and the other of two parallel guide rails 3 for a beam 4. Pulleys 5 are fixed to the ends of the rails 3, and pulleys 6 are fixed on the beam 4. Two cables 7 and 8 are stretched over the pulleys 5 and 6 to form an H, the said cables being wound on the drums 9 of the motors M1 and M2 symmetrically in reverse directions, so that when a drum is rotated, one of the cables winds up while the other cable unwinds on said drum. A carriage 10 is disposed on the beam 4 and supports a drawing member or the like, said carriage being fixed on the cable 7 stretched between the pulleys 6.

Let the rotation of the motors M1 and M2 in a positive direction be designated by + and in a negative direction by −, displacements of the beam parallel to the guide rails by Y+ and Y−, displacements of the carriage perpendicular to the rails by X+ and X−, and simultaneous displacements of the beam and carriage to give a diagonal trace by Y+X−, Y+X+, Y−X−, and Y−X+. Thus, according to the states of rotation or stoppage of the motors, the following displacements are obtained:

Displacement Y+ =(M1−, M2−)
Displacement Y− =(M1+, M2+)
Displacement X+ =(M1−, M2+)
Displacement X− =(M1+, M2−)
Diagonal displacement X+, Y+ =(M1−, M2 fixed)
Diagonal displacement X−, Y− =(M1+, M2 fixed)
Diagonal displacement X+, Y− =(M2+, M1 fixed)
Diagonal displacement X−, Y+ =(M2−, M1 fixed)

According to the diagram shown in FIG. 2, the beam 4 serves as a guide for two carriages 10 and 11, which when fixed to the same cable 7 carry out parallel displacements according to the rotation of the motors M1 and M2 in the directions X+ and X−, or make diagonal displacements as previously described with reference to FIG. 1. When the carriage 10 is fixed on the cable 7 and the carriage 11 on the cable 8, then symmetrical displacements of the carriages in the directions X+ and X− are obtained according to the motor rotation, and in particular:

Carriage 10 displacement X+ and carriage 11 displacement $$X- = (M1-, M2+)$$

Carriage 10 displacement X− and carriage 11 displacement $$X+ = (M1+, M2-)$$

As the carriages 10 and 11 can be connected to or released from the cables 7 and 8 by electro-magnetic members or the like, the beam 4 and carriages 10 and 11 can at any instant be positioned in any position on the horizontal plane swept by the beam 4.

Figure 2:
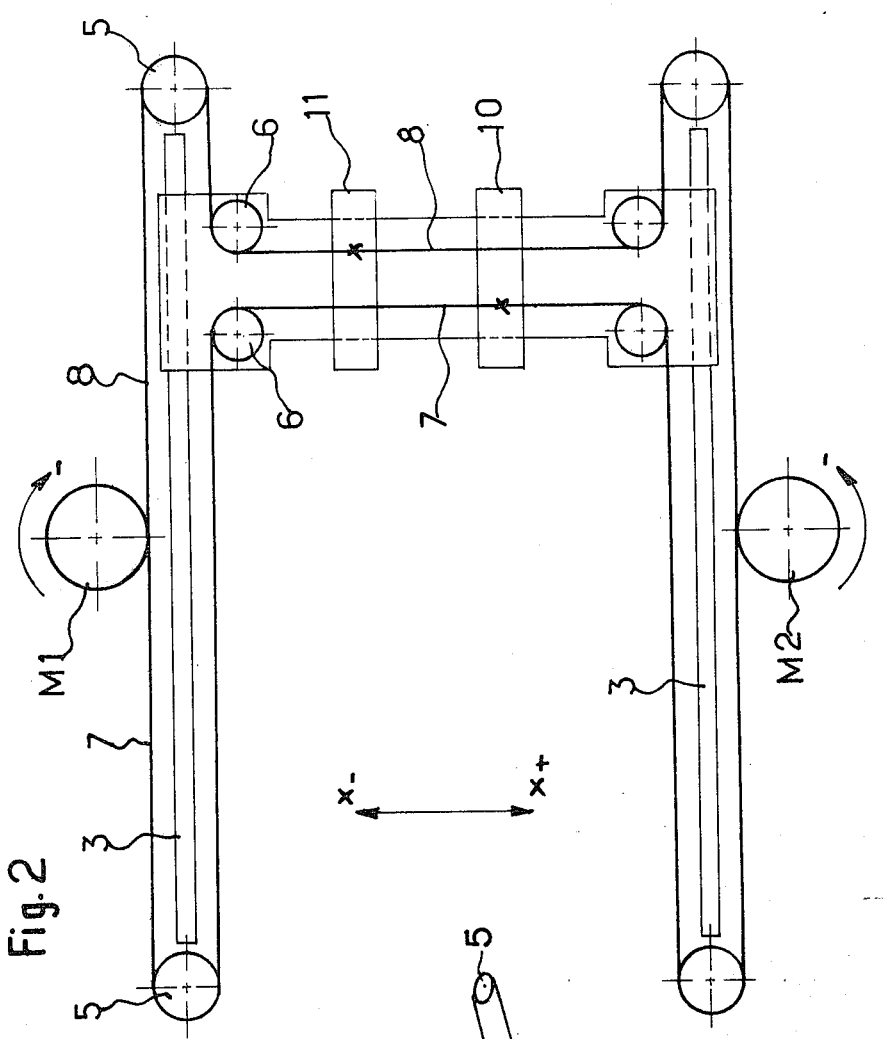
FIG. 2 is a diagrammatic view of a beam provided with two carriages.
Figure 3:
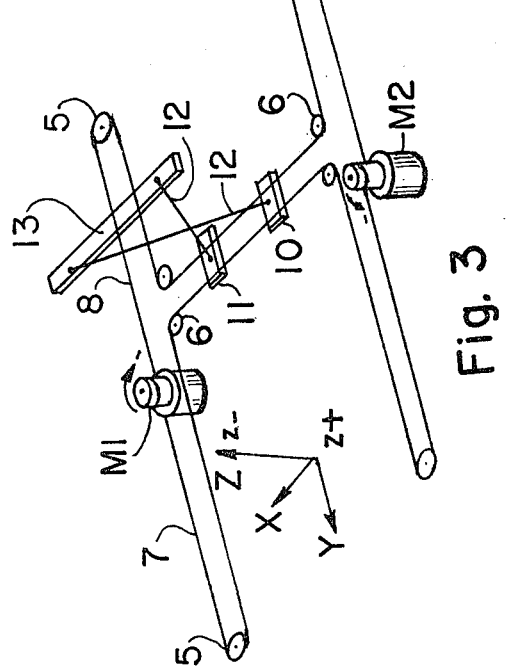
FIG. 3 is a perspective diagrammatic view of a beam provided with two carriages connected to crossed articulated arms.

As shown in FIG. 3, each carriage 10 and 11, each of which is connected to the cables 7 and 8 as described with reference to FIG. 2, is extended vertically by crossed arms 12, the ends of which are hinged to the carriages 10 and 11 and to a cross-piece 13 connecting them together and supporting a working member such as a drill, miller, tracer or the like, so enabling, when the carriages make symmetrical displacements in the directions X+ and X−, to obtain displacements of the cross-piece 13 in a vertical plane in the directions Z+ or Z−, in particular when the motors are rotated as follows:

Displacement $Z+ = (M1-, M2+)$
Displacement $Z- = (M1+, M2-)$

Alternately, the two arms can be obliquely disposed rather than crossed, in which case the cross piece will be displaced in an oblique plane.

As the carriages 10 and 11 can be connected to or released from the cables 7 and 8 at will, it is possible to make the crosspiece 13, and the member which it supports, move in all directions in the vertical plane along the perpendicular axes or along the diagonal.

According to modifications, not shown, the cables 7 and 8 are wound on the drum 9 of the motor M2 non-symmetrically relative to the winding on the drum of the motor M1, so that displacements of the beam 4 and carriage 10 or carriages 10 and 11 are generated by reverse rotations of the motor M2, as shown in FIGS. 1, 2 and 3. In this embodiment, the non-symmetrical winding of the cables can also take place on the drum 9 of the motor M1, the rotations of this latter then being the reverse of those previously described. It can also be envisaged to wind the cables symmetrically on one side and another of the guide rails 3 but opposite to the winding shown in FIG. 1, the various displacements then being obtained by motor rotations the reverse of those described with reference to FIGS. 1, 2 and 3.

It is also possible to dispose the motors and drums M1 and M2 diagonally, as for example at one end of each of the rails 3 as a replacement for the corresponding pulleys 5, the various displacements then being generated according to the direction of rotation of the motors and drums and the winding of the cables thereon. Alternately, said motors and drums can be disposed diagonally as a replacement for the beam pulleys 6.

We claim:

1. A device for driving and displacing a beam and at least one carriage attached to said beam, said device comprising:
   (a) a beam displaceable in a direction parallel to two guide rails;
   (b) at least two carriages displaceable in a direction transverse to said parallel direction;
   (c) two crossed arms, each of said arms being attached at one end to one of said carriages and at a second end to an upper cross piece adapted to support an external member; and
   (d) at least one cable stretched over a plurality of pulleys and wound around each of two drums which extend from motors rotatable in at least two directions, each of said carriages being attached to a different portion of said cable, wherein said at least one cable, said pulleys and said drums combine to effect displacement of at least one of said beam and said carriages, said at least one cable being stretched symmetrically over at least two pulleys connected to ends of said rails and a plurality of said pulleys attached to said beam so that said stretched cable defines an H-shaped configuration, said motors and said drums being symmetrically disposed on opposite rails between the ends of said rails, and said cable being wound symmetrically on opposite directions about each of said drums, whereby rotation of said motors will wind the cable on one of said drums and unwind the cable on the other of said drums, such that the carriages are displaced symmetrically by the rotation of at least one of said motors such that said cross piece will be displaced in a vertical plane.

2. A device for driving and displacing a beam and at least one carriage attached to said beam, said device comprising:
   (a) a beam displaceable in a direction parallel to two guide rails;
   (b) at least two carriages displaceable in a direction transverse to said parallel direction;
   (c) two obliquely disposed arms, each of said arms being attached at one end to one of said carriages and at a second end to an upper cross piece adapted to support an external member;
   (d) at least one cable stretched over a plurality of pulleys and wound around each of two drums which extend from motors rotatable in at least two directions, each of said carriages being attached to a different portion of said cable, wherein said at least one cable, said pulleys and said drum combine to effect the displacement of at least one of said beam and said carriages, said at least one cable being stretched symmetrically over at least two pulleys connected to ends of said rails and a plurality of said pulleys attached to said beam so that said stretched cable defines an H-shaped configuration, said motors and said drums being symmetrically disposed on opposite rails between the ends of said rails, and said cable being wound symmetrically in opposite directions about each of said drums, whereby rotation of said motors will wind the cable on one of said drums and unwind the cable on the other of said drums such that the carriages are displaced symmetrically by the rotation of at least one of said motors such that said cross piece will be displaced in an oblique plane.

* * * * *